United States Patent Office 3,302,457
Patented Feb. 7, 1967

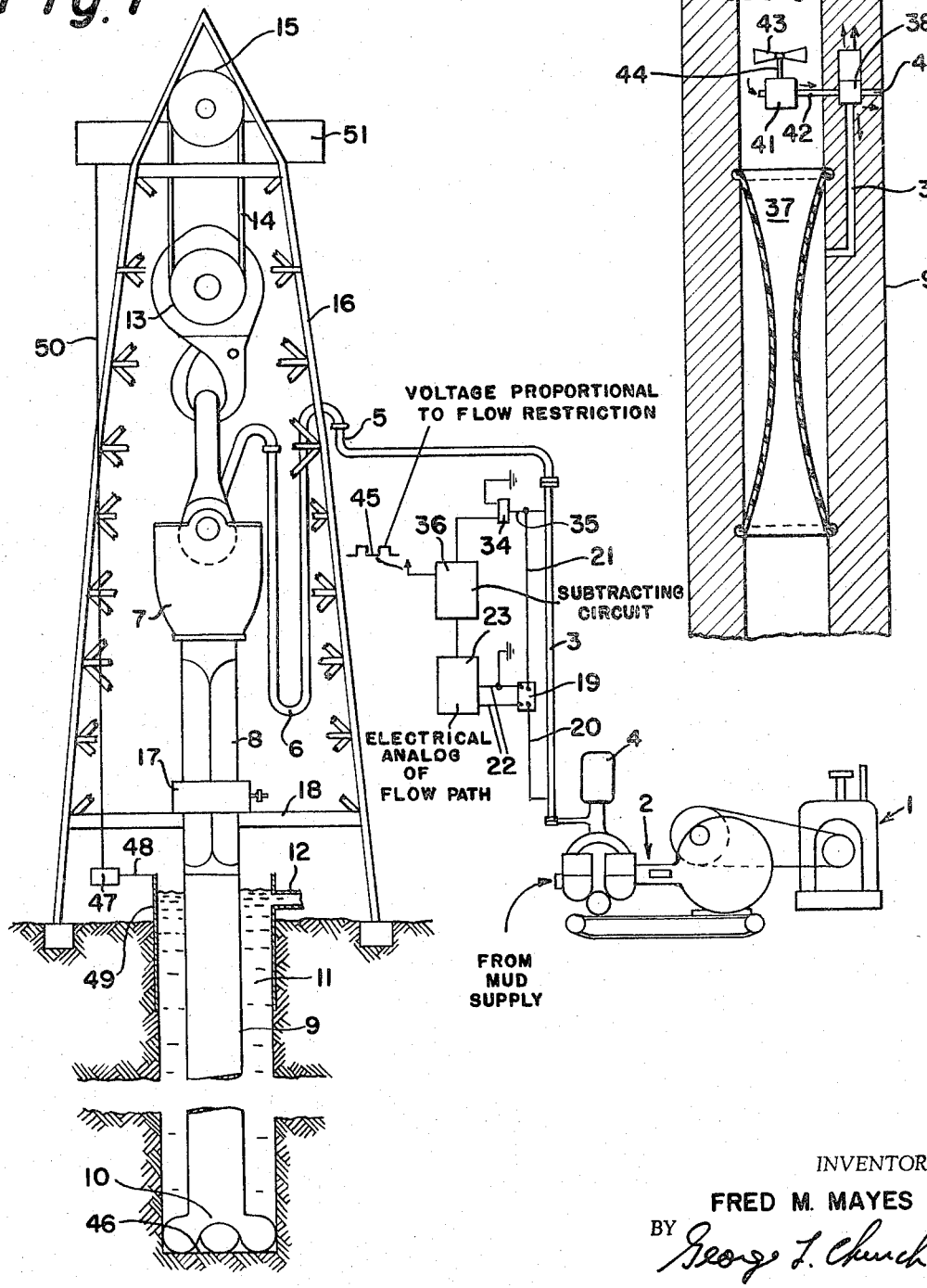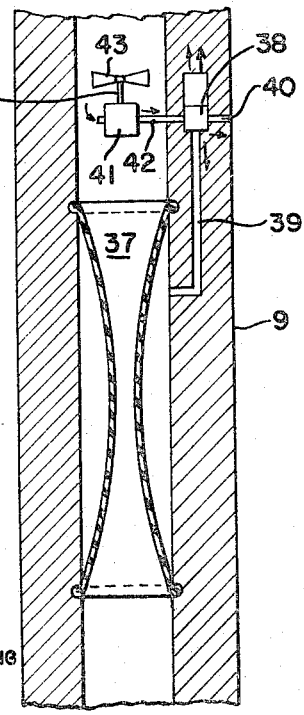

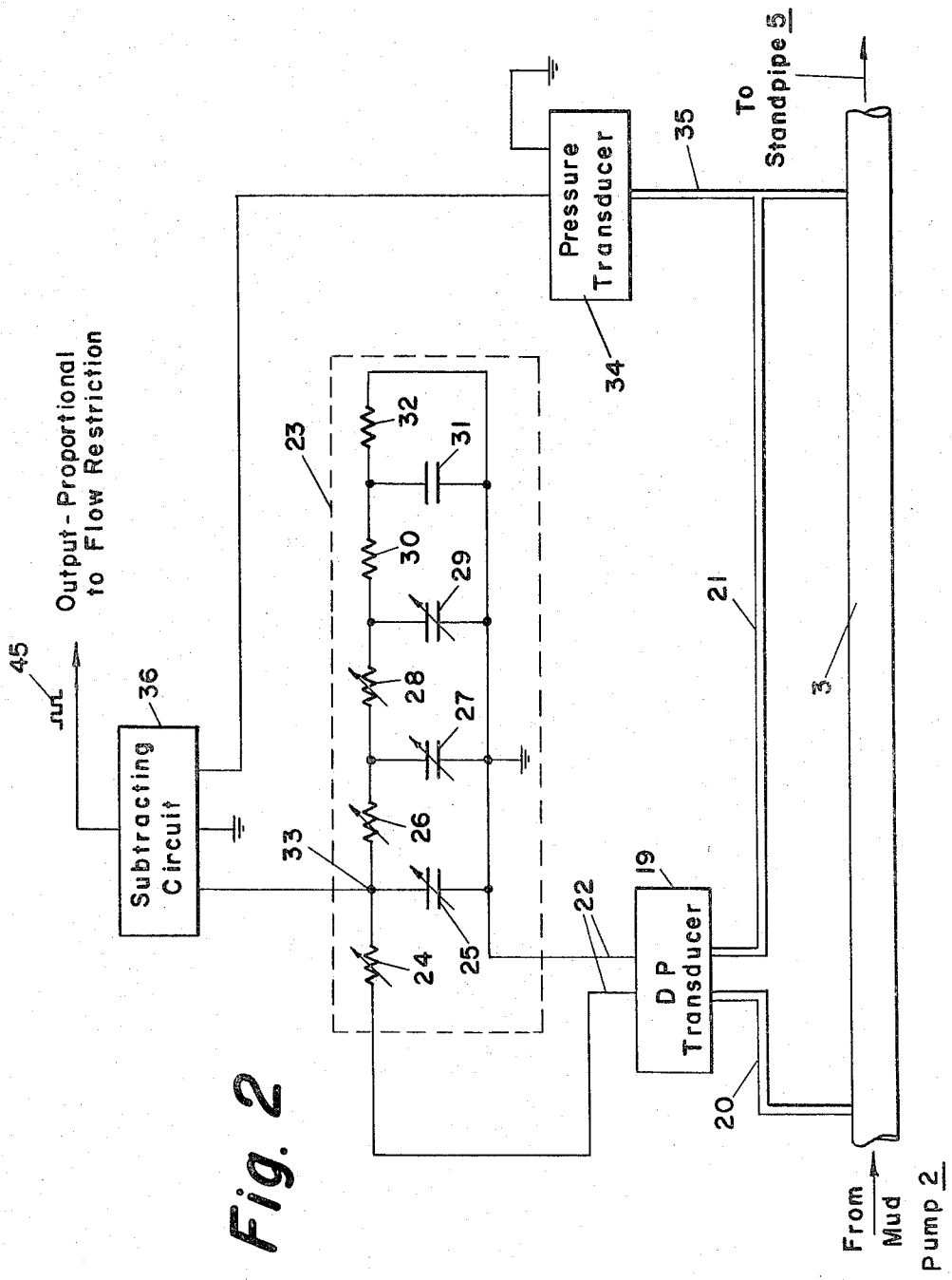

3,302,457
METHOD AND APPARATUS FOR TELEMETERING IN A BORE HOLE BY CHANGING DRILLING MUD PRESSURE
Fred M. Mayes, Richardson, Tex., assignor to Sun Oil Company, Philadelphia, Pa., a corporation of New Jersey
Filed June 2, 1964, Ser. No. 372,004
13 Claims. (Cl. 73—152)

This invention relates to telemetering, and more particularly to telemetering information from downhole to the surface, in a borehole being drilled by rotary drilling equipment, while drilling is taking place. One embodiment of the invention requires that the drilling be stopped, and the bit lifted off the bottom of the hole, while telemetering is taking place.

There is need, in rotary drilling, for a method of measuring downhole variables such as formation pressure, weight on the rotary bit, formation resistivity, temperature, and many other quantities or characteristics; also, there is a need for telemetering this information to the surface while drilling.

One telemetering method which has been proposed involves control of a restriction in the drilling fluid (mud) flow path (at a downhole location) by the variable or variables to be measured, and sensing of the resulting pressure changes at the surface. Practical designs of downhole flow controllers dictate that the downhole controlled pressure variations be quite small, and these must be measured or sensed in the presence of much larger surges which result from individual strokes of the mud pump. That is to say, there is an adverse signal-to-noise ratio, the "noise" being of a magnitude sufficient to interfere with the proper detection of the "signal."

An object of this invention is to provide a method and apparatus for eliminating, as much as possible, the effect of individual pump strokes, so that smaller pressure changes (produced by a downhole flow controller) can be detected at the surface. To state this another way, this invention provides a method of compensating for pump surges, in the measurement of mud pressure in a borehole being drilled.

The objects of this invention are accomplished, briefly, in the following manner: At the surface, a differential pressure transducer senses the pressure drop across a section of the mud line (drilling fluid flow path), and feeds a current proportional to this differential pressure into an analog network which represents the drilling fluid flow path. From this network is taken a voltage which is proportional to the pressure which should exist at the surface under constant flow path conditions, and this voltage is substractively combined with the measured (actual) pressure at the surface. The difference voltage represents a pressure variation, in the fluid flow path, which has been produced downhole by a change in the drilling fluid flow path, in response to a measurement to be telemetered to the surface. In a modification, the drilling fluid flow path change produced downhole is sensed at the surface by its effect on the bit weight, rather than by its effect on the drilling fluid pressure.

A detailed description of the invention follows, taken in conjunction with the accompanying drawings, wherein:

FIG. 1 is a diagrammatic representation of a telemetering system according to this invention;

FIG. 2 is a circuit schematic of a portion of the FIG. 1 system; and

FIG. 3 is a sectional view, somewhat diagrammatic, of the lower portion of the drill stem of FIG. 1, drawn on an enlarged scale and illustrating the downhole arrangement for producing a change in the drilling fluid flow path.

Referring first to FIG. 1, this represents an arrangement for telemetering from downhole to the surface, in a borehole being drilled by rotary drilling equipment. A prime mover 1 drives a mud pump 2, which receives drilling fluid (mud) from a mud supply (not shown) and feeds mud under high pressure to the inlet end of a calibrated mud flow line 3, a surge tank 4 ordinarily being provided at the discharge side of the pump 2. The other or outlet end of mud line 3 is coupled to a standpipe 5, which leads to a hose 6 and thence through a swivel 7 to a kelly 8 of the usual type. The drilling fluid flow path continues down through the string of drill pipe 9 and out through passages provided in a bit 10 fastened to the lower end of the drill string 9. The drilling fluid then returns to the surface by way of the annulus 11 around the drill string 9, and via the line 12 to the settling tanks or pond. Thus, it may be seen that the drilling fluid flow path includes flow line 3, standpipe 5, hose 6, swivel 7, kelly 8, drill pipe 9, bit 10, and annulus 11. For simplicity, no blowout equipment is shown at the top of annulus 11.

The drill string 9, bit 10, and kelly 8 are supported in the usual manner, through the swivel 7, from a traveling block 13, which is coupled by means of a hoisting line (cable) 14 to a crown block 15 which is secured at the top of derrick 16. Kelly 8, which has a square cross-section, is rotated by means of a so-called rotary table 17, which is mounted on the drilling platform 18 of the derrick.

Mud pump 2 is ordinarily of the reciprocating type, such that rather large pressure surges, resulting from individual pump strokes, appear in the line 3, as well as in other parts of the drilling fluid flow path. This invention is concerned with the compensation of such pump surges, or in other words with the elimination of these surges as much as possible, so that smaller pressure changes in the drilling fluid flow path can be detected at the surface. These smaller pressure changes can be produced by a bottomhole or downhole flow controller, as will be described hereinafter, and can be produced in response to some measurement to be telemetered to the surface.

A differential pressure transducer 19 is connected across the calibrated mud line 3, by means of one conduit or coupling 20 connected to the inlet end of line 3, and another conduit or coupling 21 connected to the outlet end of line 3. Transducer 19 thus measures (senses) the differential pressure across calibrated line 3; this measured differential pressure is proportional to the volume rate of mud flow through line 3, and through the entire drilling fluid flow path. Transducer 19 senses the pressure across the line 3 and produces an output current proportional thereto; this current appears on leads 22 and is, of course, propotional to the volume rate of mud flow through flow line 3. This output current is introduced into an electrical network 23 which is designed, in accordance with recognized engineering principles, to be an electrical analog of the drilling fluid flow path including the drill pipe 9 and the mud return annulus 11.

Network 23 has electrical parameters to represent compressibility and resistance to flow in the drill pipe, across the bit orifices, etc. in sufficient detail to provide an accurate analog. Some of these electrical parameters will be adjustable so that variations due to changes in mud properties and drill pipe length, mud weight, etc. can be compensated for while drilling is in progress. By way of example, the analog network 23 may have the form illustrated in FIG. 2. The first section of the network 23 may comprise an adjustable series resistance 24 and an adjustable shunt capacitance 25, which represent the resistance to flow and the compressibility, respectively, offered by the flow line 3; the output current of transducer 19 is fed into this end of the network 23. The second section of network 23 may comprise an adjustable series resistance 26 and an adjustable shunt capacitance 27, which represent the resistance to flow and the compressibility, respectively, offered by items 5, 6, 7, and 8, the standpipe, hose, swivel, and kelly. The third section of network 23 may comprise an adjustable series resistance 28 and an adjustable shunt capacitance 29, which represent the resistance to flow and the compressibility, respectively, offered by drill string 9. The fourth section of network 23 may comprise a series resistance 30 and a shunt capacitance 31, which represent the resistance to flow and the compressibility, respectively, offered by bit 10. The last section of network 23 may comprise a series resistance 32, which represents the resistance to flow offered by the mud return annulus 11.

The common junction point 33 of electrical network parameters 24, 25, and 26 represents the outlet end of line 3, i.e., the junction of line 3 and standpipe 5. Since a current proportional to the volume rate of mud flow is fed into the network 23 from transducer 19 by way of leads 22 (which latter are connected to the first section of this network), the voltage between point 33 and ground (which may be thought of as comprising an output of network 23) will be instantaneously proportional to the pressure which should exist at the outlet end of line 3 (on the surface) for a constant drilling fluid flow path, that is, under constant flow path conditions.

A pressure transducer 34 is connected by means of a conduit or coupling 35 to the outlet end of line 3, to measure the actual pressure at this surface location. If the drilling fluid flow path conditions remain constant, this measured pressure should duplicate the analog pressure (at point 33), to the degree that properties of the mud and flow path are duplicated in the analog. The pressure sensed by transducer 34 is converted by this transducer to a voltage representative of the actual pressure at a surface location (outlet end of line 3), while the analog voltage at 33, as previously stated, will be proportional to the expected surface pressure, under constant flow path conditions.

According to this invention, the measured-pressure-voltage (derived from transducer 34) is subtracted directly from the analog voltage, by means of a subtracting circuit 36 to which both of these voltages are fed. The difference voltage (output of circuit 36) will be nearly equal to zero when the flow path conditions do not change. That is, this difference voltage will be nearly equal to zero when any restrictions which may be in the flow path do not change.

Now referring to FIG. 3, this figure illustrates an arrangement for producing a change in the drilling fluid flow path at a downhole location, in response to some measurement to be telemetered to the surface. In other words, this arrangement operates to produce a variable flow restriction in the drilling fluid flow path, in response to some measurement to be transmitted to the surface. It is pointed out here that small downhole-originated variations in drilling fluid pressure, which would result from variable formation pressure or loss of drilling fluid would be detected directly, without the arrangement of FIG. 3.

Near the lower end of drill string 9, a rubber sleeve 37, somewhat toroidal in shape, is mounted within the bore or opening of the drill pipe, being secured at its upper and lower ends to the wall of the drill pipe. Sleeve 37 is inflatable to partially close the opening in drill pipe 9, through which the drilling fluid (mud) is circulating. Sleeve 37 is inflatable by the application thereto, under pressure, of drilling fluid, under the control of a solenoid-operated three-way valve 38. Valve 38 feeds the drilling mud either to the interior of sleeve 37, by way of a passage 39 in the tubing wall, or to the mud return annulus 11 surrounding drill pipe 9, by way of a passage 40. Drilling mud is supplied to valve 38 by means of a hydraulic pump 41, which takes drilling fluid from the opening in drill pipe 9 and pumps it through a pipe or tube 42 to valve 38. Pump 41 is driven by a mud turbine 43, which is positioned in the opening in the drill pipe; mud being pumped downwardly through the drill pipe flows past turbine 43 and causes it to rotate. The turbine 43 drives pump 41 by way of a shaft 44.

The solenoid valve 38 is opened and closed (to thereby connect pipe 42 to passage 39 or to passage 40, respectively) in some sequence controlled by the characteristic to be measured (resistivity, self-potential, radioactivity, etc.). Circuitry necessary to do this would be conventional in most respects, although special design precautions would have to be taken in view of the severe operating environment. For example, the ratio of closed time to open time of the valve 38 might be controlled by self-potential, so that the resulting pressure measured at the surface would be pulse width modulated. A pulse type signal is illustrated at 45. In this connection, it should be pointed out that closing and opening of valve 38 produces (by means of sleeve 37) varying restrictions in the drilling fluid flow path, resulting in pressure changes (pulses) which are transmitted to the surface and are detected thereat by pressure transducer 34.

Cycle times (for closing and opening of the valve 38) of ten seconds to a few minutes would be appropriate to allow sufficient time for transmission of pressure pulses to the surface which could easily be resolved. This low frequency would permit some additional discrimination against residual pump frequency pressure pulses, through a low pass filter.

Refer again to FIG. 1. It will be recalled that telemetering from downhole to the surface is accomplished, in the system of this invention, by producing changes in the drilling fluid flow path which result in pressure changes in this path or in the mud hydraulic system, and by detecting or sensing these pressure changes at the surface. In the embodiment described heretofore, these pressure changes or pressure variations are sensed by means of the pressure transducer 34, and the telemetering is effected while drilling.

It would be possible to detect the effect of variable pressure (in the mud flow path) in other ways, and one of these ways is illustrated in FIG. 1. If the drill pipe 9 and bit 10 are picked up so that the bit is off the bottom 46 (which would mean, of course, that the telemetering could not in this case be effected while drilling), the pressure variations in the mud flow path cause variations in bit weight, so by sensing variations in bit weight the effect of variable pressures in the mud flow path may be detected. The variations in bit weight would be more pronounced if they could be made to occur at the resonant frequency of the drill pipe in longitudinal vibration.

In order to sense the variations in bit weight, a movement sensing device 47 is coupled at 48 to the surface casing 49, and is also coupled by means of a line 50 to the top of the derrick 16, for example to the so-called "crows," nest 51. In other words, the line 50 couples the top of the derrick to the surface casing, so that relative movement therebetween can be sensed by means of the device 47. In this connection, it will be appreciated that variations in bit weight are reflected to the top of the derrick through traveling block 13, cables 14, and crown block 15, these variations thus causing movements of the top of the derrick 16 relative to some fixed object such as the surface casing 49.

The invention claimed is:

1. Method of telemetering from downhole, in a borehole being drilled by rotary drilling equipment, to the surface, which comprises developing a first signal proportional to the pressure which would exist in the drilling fluid flow path, at a certain surface location, under constant flow path conditions, producing at a downhole location a change in the drilling fluid flow path in response to a measurement to be telemetered to the surface, developing a second signal representative of the actual pressure at said surface location, and combining subtractively said first signal and said second signal.

2. Method of telemetering from downhole, in a borehole being drilled by rotary drilling equipment, to the surface, which comprises developing a first signal proportional to the pressure which would exist in the drilling fluid flow path, at a certain surface location, under constant flow path conditions, producing in on-off repetitive fashion, at a downhole location, changes in the drilling fluid flow path in response to a measurement to be telemetered to the surface, developing a second signal representative of the actual pressure at said surface location, and combining subtractively said first signal and said second signal to produce a pulsating output signal representing the pressure changes resulting from said drilling fluid flow path changes.

3. A system for telemetering from downhole, in a borehole being drilled by rotary drilling equipment, to the surface, comprising means for developing a first signal proportional to the pressure which would exist in the drilling fluid flow path, at a certain surface location, under constant flow path conditions, means for producing at a downhole location a change in the drilling fluid flow path in response to a measurement to be telemetered to the surface, means for developing a second signal representative of the actual pressure at said surface location, and means for combining subtractively said first signal and said second signal.

4. A system for telemetering from downhole, in a borehole being drilled by rotary drilling equipment, to the surface, comprising means for producing a first voltage proportional to the pressure which would exist in the drilling fluid flow path, at a certain surface location, under constant flow path conditions, means for producing at a downhole location a change in the drilling fluid flow path in response to a measurement to be telemetered to the surface, a pressure transducer for measuring the actual pressure at said surface location and for producing a second voltage proportional to the measured pressure, and means for combining subtractively said first voltage and said second voltage, thereby to produce an output signal proportional to the pressure change resulting from said drilling fluid flow path change.

5. A system for telemetering from downhole, in a borehole being drilled by rotary drilling equipment, to the surface, comprising means for developing a first signal proportional to the pressure which would exist in the drilling fluid flow path, at a certain surface location, under constant flow path conditions, means responsive to a measured characteristic for producing repetitive changes in the drilling fluid flow path, means for developing a second signal representative of the actual pressure at said surface location, and means for combining subtractively said first signal and said second signal, thereby to produce a pulsating output signal representing the pressure changes resulting from said drilling fluid flow path changes.

6. A system for telemetering from downhole, in a borehole being drilled by rotary drilling equipment, to the surface, comprising a network designed to be an electrical analog of the drilling fluid flow path, means introducing into said network an electric current proportional to the volume rate of flow of drilling fluid in said path, means for abstracting from a point in said network representing a certain surface location a first voltage proportional to the pressure which would exist in the drilling fluid flow path, at said location, under constant flow path conditions, means for producing at a downhole location a change in the drilling fluid flow path in response to a measurement to be telemetered to the surface, means coupled to said fluid flow path for producing a second voltage proportional to the actual pressure at said surface location, and means for combining subtractively said first voltage and said second voltage.

7. System in accordance with claim 6, wherein the first-mentioned means includes a differential pressure transducer coupled across a portion of said flow path one end of which portion is at said surface location.

8. System in accordance with claim 6, wherein the voltage-producing means includes a pressure transducer coupled to said flow path at said surface location.

9. System in accordance with claim 6, wherein the change-producing means operates to produce repetitive changes in the drilling fluid flow path in response to a measured characteristic.

10. System in accordance with claim 6, wherein the first-mentioned means includes a differential pressure transducer coupled across a portion of said flow path one end of which portion is at said surface location, and wherein the voltage-producing means includes a pressure transducer coupled to said flow path at said surface location.

11. System as defined in claim 10, wherein the change-producing means operates to produce repetitive changes in the drilling fluid flow path in response to a measured characteristic.

12. System in accordance with claim 6, wherein the change-producing means comprises an inflatable element disposed at a downhole location in the drilling fluid flow path, and means for causing the inflation of said element in response to a measurement to be telemetered.

13. System as recited in claim 12, wherein pressured drilling fluid is utilized for the inflation of said element.

References Cited by the Examiner
UNITED STATES PATENTS 2,472,464  6/1949  Bruce.
2,787,759  4/1957  Arps _____ 175—50 X RICHARD C. QUEISSER, *Primary Examiner.*

J. W. MYRACLE, *Assistant Examiner.*